United States Patent Office 3,251,803
Patented May 17, 1966

3,251,803
LINEAR CONDENSATION POLYMERS CONTAINING URETHANE AND CARBONATE UNITS
John R. Caldwell and Winston J. Jackson, Jr., Kingsport, Tenn., assignors to Eastman Kodak Company, Rochester, N.Y., a corporation of New Jersey
No Drawing. Filed Sept. 14, 1961, Ser. No. 137,977
4 Claims. (Cl. 260—47)

This invention relates to linear condensation copolymers. More particularly, the invention relates to the preparation of linear copolymers by condensing a mixture of bisphenol and diamine monomers with phosgene and to novel copolymers that may be prepared by this method.

An object of the invention is to provide a method for producing linear copolymers by condensation of phosgene with a mixture of bisphenol and diamine monomers.

A particular object is to provide linear polymers containing urethane and carbonate units by condensing phosgene with a mixture of at least one diamine and at least one of certain polycyclic bisphenols.

Some interfacial polycondensation procedures are well known and have been used for preparing a large number of condensation polymers. Such procedures have been used for condensing a diacid chloride (phosgene, diol bischloroformates) with a diamine to produce a polyurea or polyurethane, and with a bisphenol to produce a polycarbonate. The diacid chloride is dissolved in a water-immiscible organic solvent phase which is contacted in the presence of a catalyst with an alkaline aqueous phase containing the diamine or the bisphenol.

Polymers prepared by interfacial polycondensation procedures containing both carbonate and carbamate groups are described in Belgian Patent No. 573,065. Those polymers were prepared by first preparing a bischloroformate of a bisphenol and then condensing this bischloroformate with a diamine and a bisphenol using interfacial polycondensation procedures. Also described is the method of first preparing a low-molecular weight polycarbonate bischloroformate from phosgene and bisphenol monomers and then condensing this bischloroformate with a diamine. Ordered copolymers were obtained consisting of regularly recurring carbonate and urethane units.

We have found that random copolymers of high molecular weight can be prepared by an interfacial polycondensation method in which a bisphenol and a diamine are condensed directly with phosgene without having to prepare a bischloroformate of the bisphenol beforehand. According to the invention a bisphenol and water-immiscible organic solvent are added to an alkaline aqueous solution. The mixture is stirred while phosgene and a diamine are slowly added simultaneously, or the phosgene is added after introduction of the diamine. On further stirring, a random copolymer builds up. The molar amount of sodium hydroxide or other alkali metal base in the aqueous phase is at least sufficient to neutralize all of the acid by-product from the polymerization reaction and preferably is considerably in excess of such amount. Any of the known interfacial polycondensation catalysts such as benzyltriethylammonium chloride or tri-n-butylamine increases the rate of polymerization and is preferred but is not necessary to the reaction.

The copolymer consists of units which are polycondensation residues of phosgene or carbonic acid, a bisphenol and a diamine and consists of randomly recurring units having the general formulas:

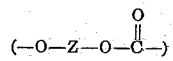

wherein Z is a bisphenol nucleus, and

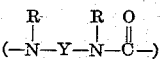

wherein Y is a diamine nucleus and R is either hydrogen or an alkyl or aryl radical. A carbonate unit occurs by condensation of phosgene between two bisphenol monomers:

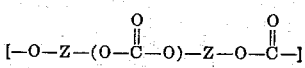

A urethane unit occurs by condensation of phosgene between one bisphenol unit and one diamine monomer:

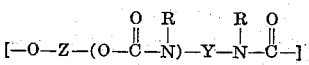

A urea unit occurs by condensation of phosgene between two diamine monomers:

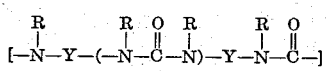

Urea units when present will impart a higher melting point to the polymer. These will occur in the polymer with urethane and carbonate units when the diamine is introduced before addition of phosgene. When urea units are not wanted in the polymer they can be suppressed simply by beginning addition of phosgene to the reaction mixture before addition of the diamine is begun and then slowly adding the diamine with the remainder of phosgene. When the reaction is carried out so that no urea units occur, the copolymer will consist of randomly recurring units which form only urethane and carbonate units:

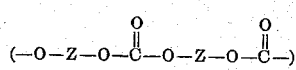

and

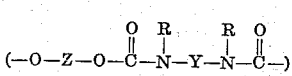

The bisphenol may contain two hydroxy groups on one aromatic ring (such as hydroquinone) or the hydroxy groups may be on different rings (such as 4,4'-dihydroxydiphenyl or 1,5-naphthalenediol). Also, the hydroxy groups may be on different aromatic rings which are separated by groups such as the following.

(R=alkyl or aryl): —CH$_2$—, —CH$_2$CH$_2$—, —R$_2$C—, —O—, —OCH$_2$CH$_2$O—, —S—, —SO—, —SO$_2$—, —SO$_2$NR—, —NR—, —CONH—, —CO—, —COO—, —COCO—, —CF$_2$—, —NRNR—, —CH=CH—,

—C≡C— phenylene, xylylene, cyclohexylene, etc.

The diamine may be aliphatic, alicyclic, or aromatic, and it may be primary or secondary. The aromatic diamines may have amino groups on different rings or both amino groups on the same aromatic ring (N,N'-dimethyl - 4,4' - sulfonyldianiline; p-phenylenediamine). The carbon chain of aliphatic diamines (primary or secondary) may be straight or branched (1,6-hexanediamine; N,N'-dimethyl-2,2-dimethyl-1,4-butanediamine). Amines containing alicyclic or aromatic rings are 1,4-cyclohexanediamine; 1,4-cyclohexanebismethylamine; m-xylylene-α,α'-diamine. Also any of the following groups may be present in the diamine molecule.

(R=alkyl or aryl): —R$_2$C—, —O—, —OCH$_2$CH$_2$O—, —S—, —SO—, —SO$_2$—, —SO$_2$NR—, —NR—,

—CONH—

—CO—, —COO—, —COCO—, —CF$_2$—, —NRNR—, —CH=CH—, —C≡C—, phenylene, cyclohexylene, etc.

In a preferred embodiment of the invention, the bisphenol used is a diphenol of a polycyclic gem-bivalent radical containing an atomic-bridged hydrocarbon ring member. These bisphenols are described in our copending application Serial No. 137,980, entitled Bisphenol Polyesters, filed of even date herewith and now abandoned in favor of our copending application Serial No. 231,589, filed October 18, 1962. Included among such bisphenols, and described in said copending application, are bisphenols having the general formula:

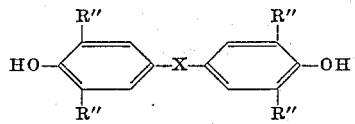

wherein R″ is a member selected from the group consisting of hydrogen atoms, alkyl groups containing from 1 to 4 carbon atoms, and halogen atoms and X is a gem-bivalent radical selected from the group consisting of radicals having the following general formulas:

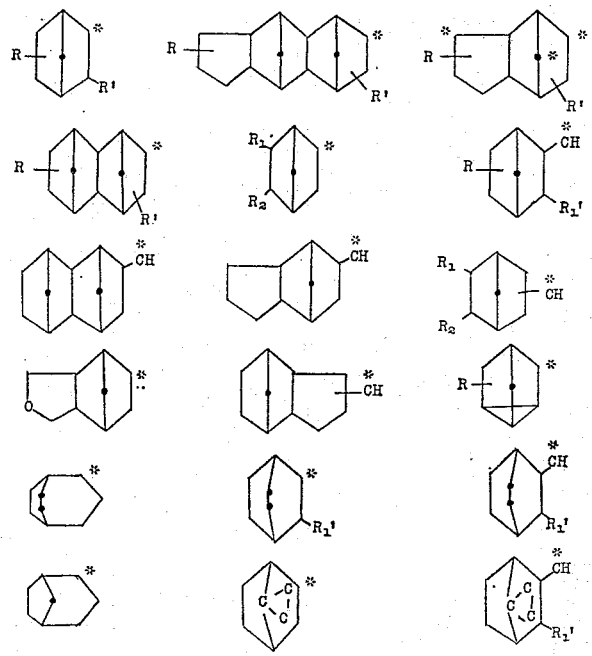

where R is at least one member selected from the group consisting of hydrogen atoms, halogen atoms and alkyl groups containing from 1 to 4 carbon atoms, R′ is a member selected from the group consisting of hydrogen atoms, halogen atoms and alkyl groups containing from 1 to 4 carbon atoms, $R_1$ and $R_2$ are members selected from the group consisting of hydrogen atoms, halogen atoms and alkyl groups containing from 1 to 4 carbon atoms and aryl groups and $R_1'$ is a member selected from the group consisting of hydrogen atoms, halogen atoms, aryl groups, and alkyl groups containing from 1 to 4 carbon atoms, and one of the carbon positions marked by an asterisk is the position of the single carbon atom at which the phenyl groups are joined to the radical.

Polymers prepared from these bisphenols by the process of the invention produce resins having markedly higher melting points than similar resins prepared using other known bisphenols. We have found that the diphenols of the gemi-bivalent polycyclic radicals containing atomic-bridged hydrocarbon rings impart high melting points and high second-order transition temperatures to the copolymers prepared by the process of the invention in which they are used as the bisphenol component.

In the condensation reaction mixture the molar ratio of bisphenol to diamine must be at least 1:1 if urea units are not wanted and may vary within a range from 1:1 to about 10:1. Preferably, a slight molar excess of phosgene over the combined molar quantity of diamine and bisphenol should be added to the reaction mixture. Any of several known water-immiscible solvents such as benzene, toluene, and tetrachloroethane can be used in the reaction mixture, but methylene chloride is preferred. The preferred temperature range of the reaction mixture is 15–25° C. Lower temperatures can be used, but they are more inconvenient to maintain and a longer reaction time is required. Higher temperatures can be used, but often the inherent viscosity of the polymer is lower due to increased hydrolysis at higher temperatures. Conventional procedures for separating the copolymer product from the reaction mixture and purifying the interfacial polycondensation product may be used.

Many of the copolymers prepared by condensing phosgene with a mixture of diamines and bisphenols, as described above, are insoluble in the chlorinated hydrocarbon solvents ordinarily used for dry cleaning, such as tetrachloroethylene. These copolymers retain many of the advantageous properties of the polycarbonate resins but are resistant to cleaning solvents and so are particularly well suited for making fiber for use in apparel fabric.

Specific examples illustrating the invention follow.

*Example I*

To a cooled, stirred mixture containing 5.7 g. of sodium hydroxide, 50 ml. of water, 125 ml. of methylene chloride, 2 drops of tri-n-butylamine and 8.4 g. (0.025 mole) or 4,4′-(hexahydro-4,7-methanoindan-5-ylidene)-diphenyl hydrate was simultaneously added 3.6 g. (0.025 mole) or 4,4′-(hexahydro-4,7-methanoindan-5-ylidene)-water and 5.4 g. (0.054 mole) of phosgene (measured as the weight loss of a lecture bottle). The mixture was stirred for 20 minutes and then was neutralized with acetic acid. The methylene chloride layer, which contained polymer in suspension, was washed with water and then was added to acetone to precipitate all of the polymer. The product was collected and dried. The white particles softened at 240–260° C. They appeared to be unaffected by tetrachloroethylene.

*Example II*

The process of Example I was repeated using 0.025 mole of 4,4′-methylenedianiline, which was added at the beginning of the reaction before the phosgene. The copolymer was precipitated in hexane. It softened at 290–310° C. and was substantially unaffected by tetrachloroethylene.

*Example III*

By the procedure of Example I a copolymer was prepared from 0.025 mole of 4,4′-(2-norcamphanylidene)-bis(2,6-dichlorophenol), 0.020 mole of 1,6-hexanediamine, and 0.050 mole of phosgene. The copolymer softened at 300–320° C. and was substantially unaffected by tetrachloroethylene.

*Example IV*

A copolymer was prepared from 0.025 mole of 4,4′-(3-methyl-2-norcamphanylmethylene)diphenol, 0.020 mole of m-xylylene-α,α′-diamine (added before the phosgene), and 0.05 mole of phosgene. The procedure of Example I was used. The copolymer softened at 265–285° C. and was substantially unaffected by tetrachloroethylene.

*Example V*

A copolymer was prepared from 0.025 mole of 4,4′-(decahydro-1,4,5,8-dimethanonaph - 2-yl - methylene)di-phenol, 0.025 mole of 1,4-cyclohexanediamine,, and 0.055 mole of phosgene. The procedure of Example I was used. The copolymer softened at 260–290° C. and was substantially unaffected by tetrachloroethylene.

Specific examples in this written description are given to illustrate specific embodiments of the invention and should not be construed to limit the scope of the invention as defined in the following claims.

We claim:
1. A linear condensation copolymer consisting of recurring units having the general formulas

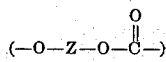

and

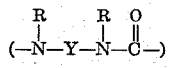

wherein R represents a member selected from the group consisting of hydrogen atoms, alkyl radicals and aryl radicals, Y represents a diamine nucleus, and Z represents the nucleus of the bisphenol having the general formula

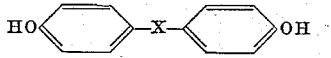

wherein X represents a saturated polycyclic gem-bivalent radical containing an atomic-bridged hydrocarbon ring member.

2. A linear condensation copolymer consisting of recurring units having the general formulas

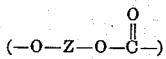

and

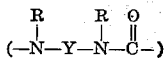

wherein R represents a member selected from the group consisting of hydrogen atoms, alkyl radicals and aryl radicals, Y represents a diamine nucleus, and Z represents the nucleus of the bisphenol having the general formula

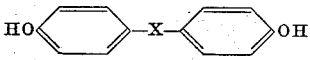

wherein X represents a gem-bivalent radical selected from the group consisting of radicals having the general formulas:

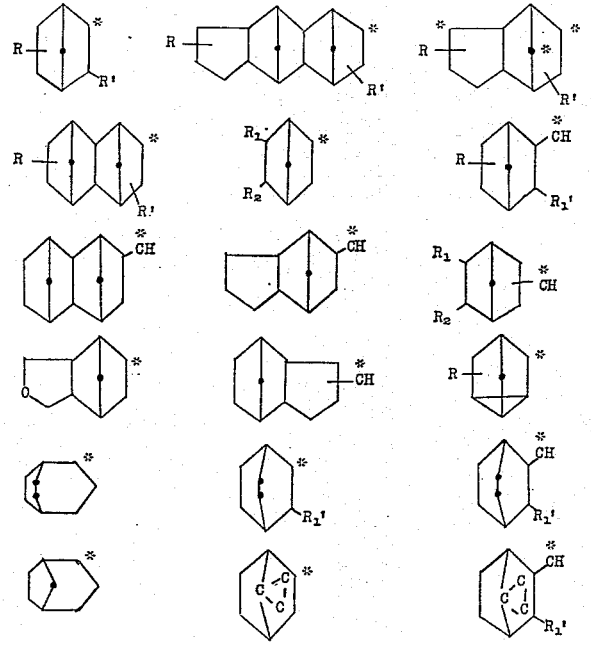

where R is at least one member selected from the group consisting of hydrogen atoms, halogen atoms and alkyl groups containing from 1 to 4 carbon atoms, R' is a member selected from the group consisting of hydrogen atoms, halogen atoms and alkyl groups containing from 1 to 4 carbon atoms, $R_1$ and $R_2$ are members selected from the group consisting of hydrogen atoms, halogen atoms and alkyl groups containing from 1 to 4 carbon atoms and aryl groups, and $R_1'$ is a member selected from the group consisting of hydrogen atoms, halogen atoms, aryl groups, and alkyl groups containing from 1 to 4 carbon atoms, and one of the carbon positions marked by an asterisk is the position of the single carbon atom at which the phenyl groups are joined to the radical.

3. A linear condensation copolymer consisting of recurring units having the general formulas

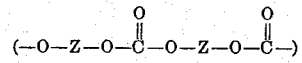

and

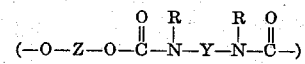

wherein R represents a member selected from the group consisting of hydrogen atoms, alkyl radicals and aryl radicals, Y represents a diamine nucleus, and Z represents the nucleus of a bisphenol having the general formula

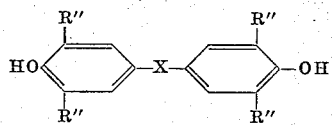

wherein R'' represents a member selected from the group consisting of hydrogen atoms, halogen atoms and methyl, ethyl, propyl and butyl radicals, and X represents a saturated polycyclic gem-bivalent radical containing an atomic-bridged hydrocarbon ring member.

4. A linear condensation copolymer consisting of recurring units having the general formulas

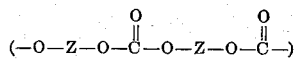

and

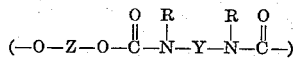

wherein R represents a member selected from the group consisting of hydrogen atoms, alkyl radicals and aryl radicals, Y represents a diamine nucleus, and Z represents the nucleus of the bisphenol having the general formula

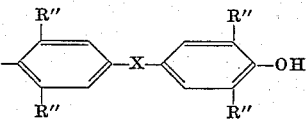

wherein R'' is a member selected from the group consisting of hydrogen atoms, alkyl groups containing from 1 to 4 carbon atoms and halogen atoms, and X represents a gem-bivalent radical selected from the group consisting of radicals having the general formulas:

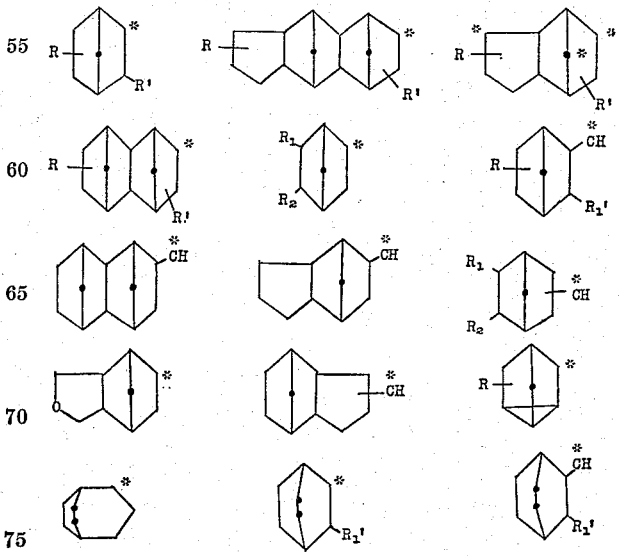

  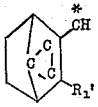

where R is at least one member selected from the group consisting of hydrogen atoms, halogen atoms and alkyl groups containing from 1 to 4 carbon atoms, R' is a member selected from the group consisting of hydrogen atoms, halogen atoms and alkyl groups containing from 1 to 4 carbon atoms, $R_1$ and $R_2$ are members selected from the group consisting of hydrogen atoms, halogen atoms and alkyl groups containing from 1 to 4 carbon atoms and aryl groups, and $R_1'$ is a member selected from the group consisting of hydrogen atoms, halogen atoms, aryl groups, and alkyl groups containing from 1 to 4 carbon atoms, and one of the carbon positions marked by an asterisk is the position of the single carbon atom at which the phenyl groups are joined to the radical.

References Cited by the Examiner

UNITED STATES PATENTS

| | | | |
|---|---|---|---|
| 2,761,879 | 9/1956 | Soloway | 260—598 |
| 2,999,844 | 9/1961 | Muller | 260—47 |
| 3,075,949 | 1/1963 | Caldwell | 260—47 |

FOREIGN PATENTS

| | | |
|---|---|---|
| 1,221,239 | 1/1960 | France. |
| 1,082,405 | 5/1960 | Germany. |
| 599,389 | 10/1959 | Italy. |

OTHER REFERENCES

SPE Journal, pp. 485–495, June 1951.

SAMUEL H. BLECH, *Primary Examiner.*

LOUISE P. QUAST, *Examiner.*

J. C. MARTIN, *Assistant Examiner.*